UNITED STATES PATENT OFFICE.

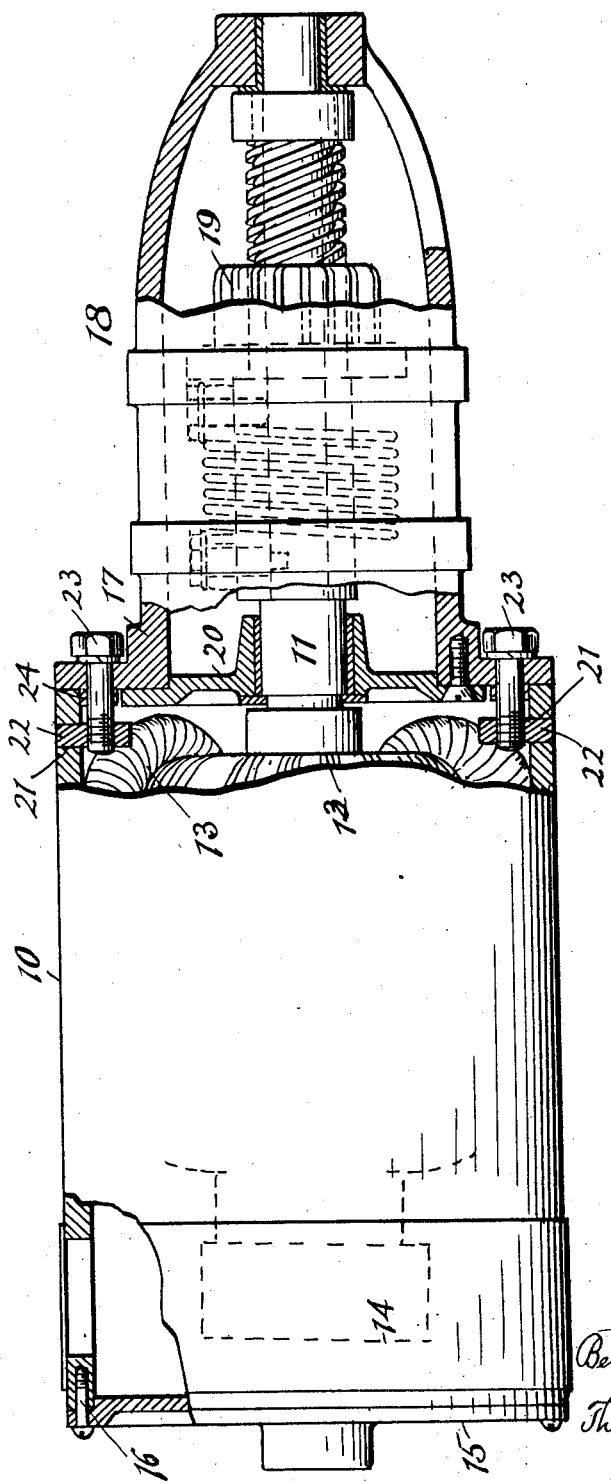

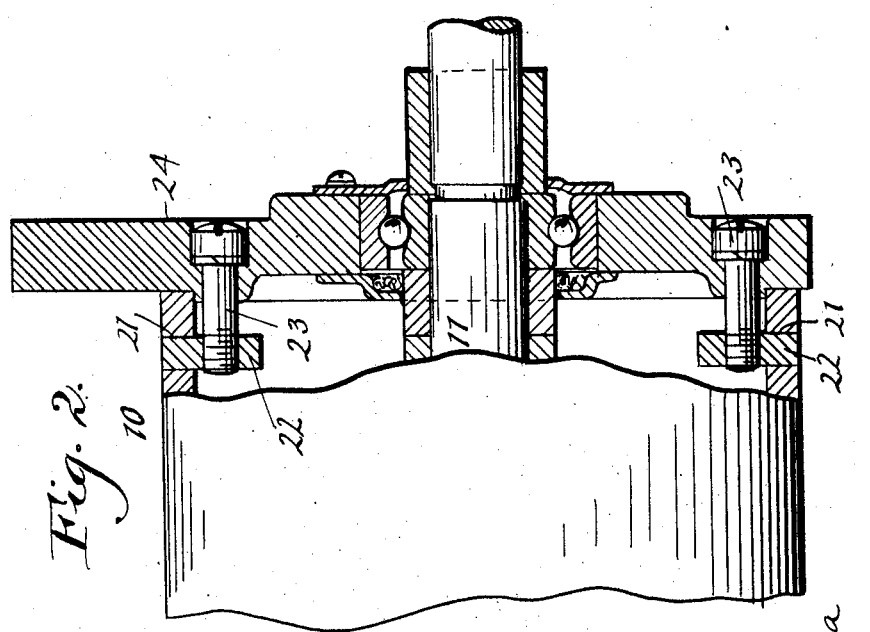
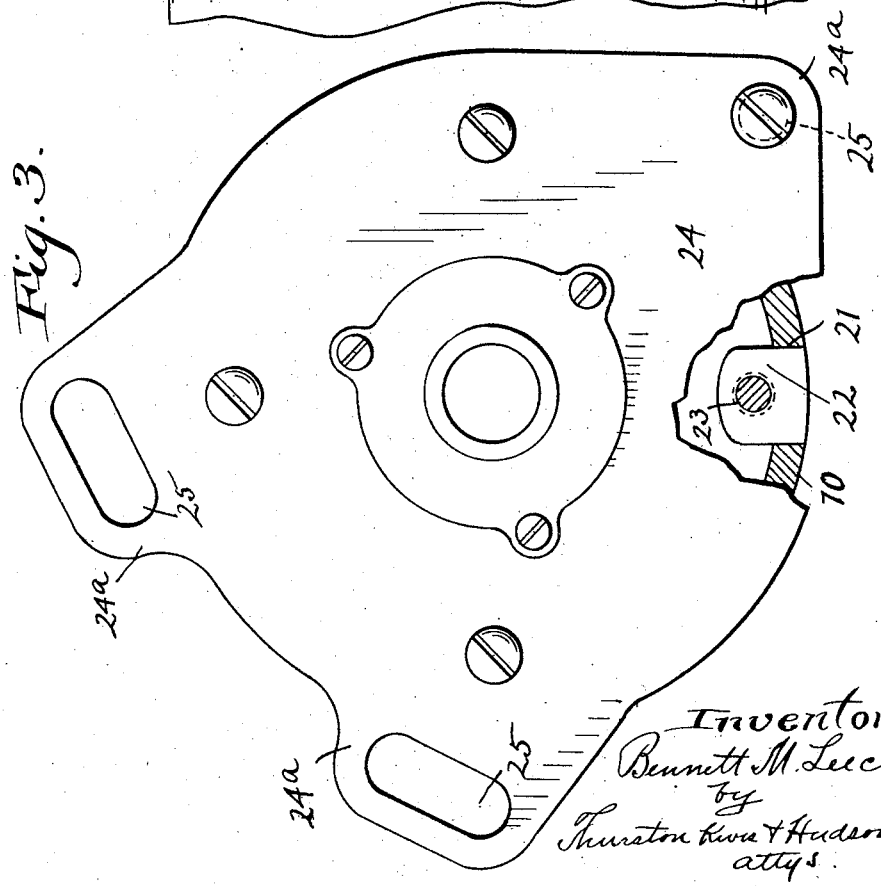

BENNETT M. LEECE, OF CLEVELAND, OHIO, ASSIGNOR TO THE LEECE-NEVILLE COMPANY, OF CLEVELAND, OHIO, A CORPORATION OF OHIO.

DYNAMO-ELECTRIC MACHINE.

1,411,442.     Specification of Letters Patent.     Patented Apr. 4, 1922.

Application filed March 14, 1921. Serial No. 452,047.

*To all whom it may concern:*

Be it known that I, BENNETT M. LEECE, a citizen of the United States, residing at Cleveland, in the county of Cuyahoga and State of Ohio, have invented a certain new and useful Improvement in Dynamo-Electric Machines, of which the following is a full, clear, and exact description.

This invention relates to dynamo-electric machines, and particularly to an improved way of securing together the field frame and one or both end housings, the invention having particular utility for fastening together the field frame and the end housing located at what is termed the driven end of the machine.

The invention finds its greatest utility with relatively small machines such as starting motors and lighting and battery charging generators for vehicle use, utilizing a field frame formed from a section of pipe or tubing.

In machines whose field frames are formed from pipe sections or tubing, the end housing at the driving end of the machine has in the past been secured in place in different ways. For example, it is customary to extend a flange of the end housing either over the end of the tube or inside of it and to fasten the parts in place by radially disposed screws. This is not entirely satisfactory in view of the fact that it enlarges the diameter of the tube at the driving end, or requires counter-sinking of the screws into the tube. Additionally it requires an exactness in construction which is expensive, and it is often the case that the end of the tube is not held flush against the face of the end housing. Furthermore, it is sometimes the case that the flange on the end housing when fitted into the tube interferes with the field coils, necessitating an increase in the length of the machine which would otherwise not be necessary.

Another way of fastening together the frame and housing is by means of axially disposed screws which are screwed into the end of the tube. This, however, to be effective for the driving end of the machine requires a tube of extra thickness which increases the expense of the machine.

In accordance with the present invention the tube is provided with radial slots close to its end, and lugs in the form of elongated nuts are inserted in the slots with threaded openings just inside the periphery of the tube to accommodate axially disposed screws passing through the end housing.

In the accompanying sheet of drawings, Fig. 1 is a vertical sectional view of a starting motor with the housing at the driving end secured to the field frame by my invention; Fig. 2 is a sectional view of the driving end of a machine which may be a motor or generator showing an end housing of different construction than illustrated in Fig. 1; and Fig. 3 is an end view of the machine shown in Fig. 2.

Referring now to the drawings, and first to Fig. 1, the field frame 10 is annular or cylindrical, and preferably consists of a section of a drawn steel tube or pipe such as commonly employed particularly in starting and lighting apparatus. The armature shaft 11, armature, field coil 13, commutator 14 and other features or parts which are not material to the present invention may have any suitable construction. In this instance the end housing 15 at the end remote from the driving end is fastened to the end of the tube by axially disposed screws 16 which are screwed into the end of the tube. It may be here stated, however, that the fastening means utilized at the driving end, may if desired, be utilized also for fastening both end housings to the field frame, but in view of the fact that the stresses to which the end housing 15 is subjected are relatively small, the simpler means of fastening illustrated at the left hand side of Fig. 1 may be employed.

As shown in Fig. 1, the housing 17 at the driving end of the machine has an elongated portion 18 which encloses several parts of what is known as a Bendix drive 19, utilized in this case for connecting the machine to the fly-wheel gear of an internal combustion engine, though the particular shape of the end housing 17 herein illustrated, is not at all material to the invention. The housing 17 at its inner end receives and has secured to it, an inner bearing disk 20 which provides in this case, an intermediate bearing for the shaft in addition to the bearings which the shaft has in the two housings.

To fasten the end housing 17 to the field frame 10, the latter is provided near its driving end with a plurality of radially disposed slots 21 into which are fitted lugs in the form of elongated nuts 22 (see Figs. 1 and 3), the outer ends of which are flush with the outer surface of the tube 10. If desired, the opposite edges of these lugs or nuts may be on a slight taper so that they will fit fairly tightly in the slots and not drop through them during assembly, it being unnecessary that the fit be such that they are driven tightly into place, or that anything like a rigid connection be formed between these lugs and the tube 10.

There may be any number of these nuts or lugs 22, the number depending usually upon the size of the machine. For a two pole machine, two will be sufficient. For a four pole machine I prefer to use four, although any number can be employed. If the field coils extend close up to the end housing, as shown in Fig. 1, these lugs or nuts are preferably arranged between the field coils so as not to interfere with them, it being one of the advantages of the invention that the field coils can be brought up close to the end housing without interfering with or being interfered by the fastening means between the housing and field frame, thus permitting in many instances a shortening of the field frame or tube, and of the machine as a whole. The lugs project inwardly beyond the inner periphery of the tube 10, and just inside the periphery are provided with tapped openings which are adapted to accommodate axially disposed fastening screws 23 extending through the end housing 17 from its outer side.

With this construction the end of the tube 10 is pulled tight up against, or is flush with the inner face of the end housing, the latter being preferably provided with a narrow pilot flange 24 which fits inside the end of the tube. At the same time the tube and end housing are fastened together very tightly and durably, without in any way adding to the outside diameter of the field frame either by screws or flanges, and without the necessity for counter-sinking as is often and generally the case when axially disposed fastening screws are employed, and the fastening means illustrated permits the use of a thin tube or pipe 10 and is no factor at all in the determination of the thickness of the tube. Furthermore, irrespective of the thickness of the tube or pipe, I am enabled to employ as large a bolt or screw 23 as is desired. As a further advantage of no little importance over the prior fastening methods employed, I wish to point out that the construction here employed requires less machining and makes an easier assembling job than the prior constructions. A slight misalignment of openings through which the screws pass is of no consequence and has no effect on the strength of the attachment or attaching means, for in practice it has been found that a slight tilting or skewing of the lugs which may take place when the screws 23 are driven home, has the effect of increasing the holding power of the screws by locking them in place.

It will be seen, therefore, that my improvement is of considerable importance inasmuch as it results in a decrease in the cost of the machine in the way of decrease in labor and material, it does not add to the overall diameter of the machine, and results in a mounting or attachment of superior character.

The machine shown in Fig. 1 may be supported in different ways, either by attaching the body or field frame 10 to a bracket or other support, or, an end mounting such as is common for starting motors and lighting and battery charging generators of vehicles, may be employed. In the latter event, the end housing 17 will have ears or lugs by which the end of the machine may be clamped to the appropriate part of the engine should the machine be used in connection with an internal combustion engine, or to any other support. This type of mounting I have illustrated in Figs. 2 and 3, which show an end housing 24 secured to the field frame or tube 10 in precisely the manner already explained. The plain end housing, such as I employ at the driving end of a lighting and battery charging generator is here shown, this end housing having at three spaced points, projecting portions 24[a] with openings 25 to accommodate clamping bolts to permit the end housing, and hence the machine as a whole to be secured to the supporting member, two of the openings 25 being shown elongated so as to permit an adjustment of the machine on the support.

The construction shown in Figs. 1 to 3 show the adaptability of my invention for both motors and generators irrespective of the shape of the end housing. Furthermore, I wish to make clear the fact that the invention may be utilized, if desired, for securing both end housings to the field frame, and that the invention may be used for dynamo-electric machines other than those employed in starting and lighting apparatus.

Having described my invention, I claim:

1. A dynamo-electric machine having a field frame and an end housing, the frame having slots adjacent the end housing, and lugs fitted into the slots and projecting inwardly on the inner side of the field frame, and fastening means extending between the lugs and end housing to secure the frame and housing together.

2. A dynamo-electric machine including a field frame and an end housing, and means for securing them together comprising nuts carried by the frame near its end and axial screws extending between the nuts and the housing.

3. A dynamo-electric machine comprising a field frame with a plurality of spaced openings near its end, radially disposed nuts seated in the openings and projecting inwardly beyond the inner surface of the field frame, and axially disposed screws extending through the housing and engaging the nuts.

4. A dynamo-electric machine having a field frame in the form of a tube or pipe section provided with radial slots near one end, lugs fitted or seated into the slots and projecting inwardly therefrom, and an end housing secured to the inwardly projecting portions of the lugs.

5. A dynamo-electric machine having a field frame in the form of a tube or pipe section provided with slots near one end, lugs fitted or seated in the slots and provided with substantially axially disposed threaded openings, an end housing, and screws extending between said end housing and lugs and securing together the end housing and frame.

In testimony wherof, I hereunto affix my signature.

BENNETT M. LEECE.